J. Palen,

Harness.

No. 97,799.　　　　Patented Dec. 14, 1869.

Witnesses.
J. K. Dulee.
C. N. Woodward.

John Palen
by
J. Fraser & Co.
Attys

United States Patent Office.

JOHN PALEN, OF LOCKPORT, ASSIGNOR TO NATHAN T. HEALY, OF MEDINA, NEW YORK.

Letters Patent No. 97,799, dated December 14, 1869.

IMPROVEMENT IN HARNESS FOR HORSES.

The Schedule referred to in these Letters Patent and making part of the same

To all whom it may concern:

Be it known that I, JOHN PALEN, of Lockport, in the county of Niagara, and State of New York, assignor to Nathan T. Healy, of Medina, New York, have invented a certain new and useful Improvement in Harness for Horses, of which the following is a specifiation.

My invention relates to that part of the harness known as the neck-strap, which goes over the neck or fore-shoulders of a horse, the two lower ends being fastened to the breast-plate or collar, of which the tugs are a continuation; and consists in forming said neck-strap of a single length, extending down nearly to the breast-collar, and connected therewith by side-straps, secured to the breast-collar, and passing up through loops to the top of the neck-strap, where they are secured, by a single buckle, at the apex, by which means the buckles ordinarily used on the sides are avoided, and the consequent catching of the reins, mane, and whip obviated.

In the drawings—

Figure 1:
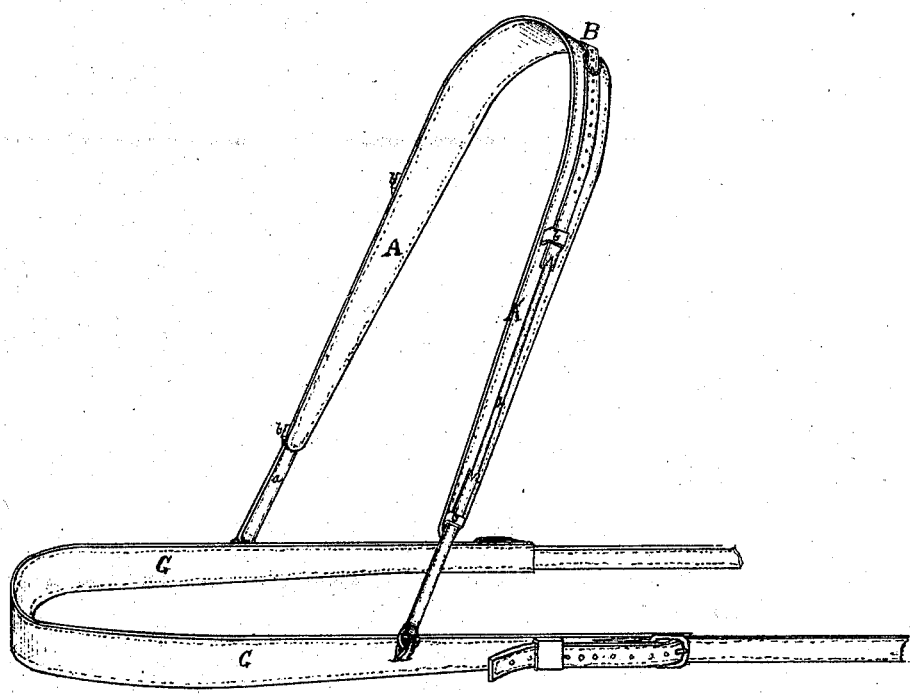
Figure 1 is a perspective view of my improvement, in about the position it occupies in use.
Figure 2:
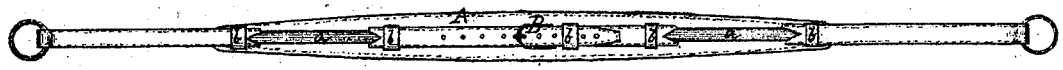
Figure 2 is a plan.

A is the main part of the neck-strap, made of leather, which lies on the neck and shoulders of the horse, and a a, the two smaller side-straps, secured to breast-plate G, and passing up through loops b b, and made to adjust higher or lower, by means of a single buckle, B, which comes at the top of the neck of the horse, and in the centre of the strap itself, thus being out of the way of the mane, and, what is of more importance still, doing away with the buckles which are usually placed on the sides of neck-straps, and which are continually catching the mane, the net, the whip-lash, or the hitch-strap.

By thus dispensing with the side buckles, I not only avoid catching the reins, and other parts, but my device is stronger than the old style, and much neater and plainer in appearance, and its advantages will at once commend it to horsemen and others.

I claim—

The construction and arrangement of the neck-strap, as herein described, the same consisting of the length A, passing over the horse's shoulders, and the side-straps a a, attached to the breast-plate or collar, passing up through loops, and received at the top by a single buckle, or any other device, whereby side-buckles are dispensed with, substantially as set forth.

In witness whereof, I have hereunto signed my name, in the presence of two subscribing witnesses.

JOHN PALEN.

Witnesses:
N. T. HEALY,
WM. B. WARREN.